| United States Patent [19] | [11] Patent Number: 4,469,956 |
|---|---|
| D'Amato | [45] Date of Patent: Sep. 4, 1984 |

[54] WINDMILL SUPPORT STRUCTURE

[75] Inventor: Richard D'Amato, Sudbury, Mass.

[73] Assignee: U.S. Windpower, Inc., Burlington, Mass.

[21] Appl. No.: 460,655

[22] Filed: Jan. 24, 1983

[51] Int. Cl.³ .......................... F03D 5/04; H02P 9/04
[52] U.S. Cl. ........................................ 290/55; 290/44; 52/40; 52/295; 52/296; 52/167; 416/120; 416/132 B
[58] Field of Search ................ 290/55, 44, 52, 50, 290/53; 52/40, 295, 296, 299, 27, 120, 223, 167; 343/878; 248/183; 416/120, 132 B, 135, 141

[56]  References Cited

U.S. PATENT DOCUMENTS

| 468,186 | 2/1892 | Beardsley . | |
|---|---|---|---|
| 1,847,634 | 3/1932 | Strieffler . | |
| 1,871,132 | 8/1932 | Rawson . | |
| 2,053,226 | 9/1936 | Ruge . | |
| 2,360,792 | 10/1944 | Putnam | 290/4 R |
| 3,110,464 | 11/1963 | Baratoff et al. . | |
| 3,212,745 | 10/1965 | Lode . | |
| 3,232,015 | 2/1966 | Latham . | |
| 3,245,177 | 4/1966 | Chen . | |
| 3,342,447 | 9/1967 | Marsh | 52/167 X |
| 3,418,768 | 12/1968 | Cardan . | |
| 4,068,131 | 1/1978 | Jacobs . | |
| 4,117,637 | 10/1978 | Robinson . | |
| 4,186,313 | 1/1980 | Wurtz . | |
| 4,187,573 | 2/1980 | Fyfe et al. | 52/167 X |
| 4,228,363 | 10/1980 | Jacobs et al. | 290/44 |
| 4,278,726 | 7/1981 | Wieme | 248/560 X |
| 4,302,684 | 11/1981 | Gogins | 290/44 X |
| 4,328,648 | 5/1982 | Kalpins | 52/167 |
| 4,330,103 | 5/1982 | Thuries et al. | 52/167 X |
| 4,363,149 | 12/1982 | Kondo et al. | 52/167 X |

FOREIGN PATENT DOCUMENTS 2328810 10/1975 France .

OTHER PUBLICATIONS

"Wind Power Recent Developments", Energy Technology Review No. 46, edited by D. J. De Renzo, Noyes Data Corporation, Park Ridge, NJ 07656.

Primary Examiner—B. Dobeck
Assistant Examiner—Paul Shik Luen Ip
Attorney, Agent, or Firm—Cesari and McKenna

[57]  ABSTRACT

A windmill installation (10) includes a windmill (12) supported on a tower (18) that includes three legs (20, 22, and 24). The connections of the legs (20, 22, and 24) to their respective bases (36, 37, and 38) are provided by compliance members (30, 32, and 34) that are compliant enough that the natural frequency of axial bending of the windmill installation is less than the frequency with which blades (14) of the windmill (12) pass behind the tower (18). Also, a windmill compliance assembly (28) provides the connection between the windmill (12) and the tower (18) and has enough compliance that the natural frequency of pivotal bending is also below that frequency. As a result, vibration at a resonant frequency of the structure is avoided during normal operation.

4 Claims, 6 Drawing Figures

WINDMILL SUPPORT STRUCTURE

BACKGROUND OF THE INVENTION

The present invention relates to windmills. It is directed particularly to windmill support structures.

The towers that support windmills used for electric power generation are subject to considerable stresses that arise from the force of the wind on the windmill turbine. The wind force strains the tower, tending to bend it. The bending occurs to accommodate horizontal translation of the windmill and windmill pivoting. The windmill tower must therefore be designed not only to support the windmill against gravitation but also to withstand expected wind forces and the resultant bending in whatever mode it occurs.

It has been found that multi-leg towers are well suited to use with windmills. For a given amount of structural material, the strength of a multi-leg tower in resisting the wind force is relatively high. Moreover, the multi-leg tower is an open structure, so its interference with wind flow is low. And, because of the distribution of gravitational force through its structure, its foundation does not need to be very elaborate. In addition, it can be made easy to climb to provide access to the windmill for maintenance and repair.

However, the multi-leg tower can be subject to certain design complications that result from the periodic nature of the expected stresses. Even though the tower causes relatively little interference with wind flow, it still presents some. A windmill blade passing the tower therefore experiences a momentary reduction in wind force, and the windmill thus experiences a vibrational component having a fundamental frequency equal to the rotational frequency of the turbine multiplied by the number of turbine blades. Additionally, due to unavoidable asymmetries, a component of vibration can also be introduced at the rotational frequency of the turbine.

This expected vibration adds a constraint to the tower design. If the natural frequency of any bending mode of the tower is roughly equal to an expected vibrational frequency or one of its harmonics, the vibration can couple a significant proportion of wind power into the tower structure itself. Therefore, either the designer must provide the necessary strength—with the attendant material weight—required to withstand the vibration at the natural frequency of the tower, or he must design it so as to insure that the natural frequencies of the tower are certain to be different from the expected vibrational frequencies.

Although it is possible to arrange the design so the natural frequencies differ from the expected vibrational frequencies, the result often is that some of the other design objectives must be compromised. Furthermore, a tower design suitable for one windmill must often be completely changed to be adequate for a second windmill, even when the second windmill is smaller.

By and large, these problems are not encountered if a single-leg tower is used. For a given support strength, the single-leg tower is more compliant, and its natural frequencies thus are usually well below the expected vibrational frequencies. Use of the single-leg tower has certain drawbacks, however. For a given strength, it requires more structural material. Also, since the bending moment of the single leg can be very great, its foundation must be considerably more elaborate than the foundation for the multi-leg tower. Also, the single-leg tower is not an open structure like the multi-leg tower, so it provides greater interference with wind flow. This in turn somewhat compromises its main advantage because, although the coupling of vibrational energy into the single-leg tower is generally less efficient, the variations in force that give rise to the vibration tend to be greater.

Nonetheless, a single-leg tower that is adequate for a given windmill can in general be expected to be adequate for another windmill of the same or a smaller mass, and no significant redesign is required. Thus, the single-leg tower has a versatility that prior-art multi-leg towers do not possess.

It is an object of the present invention to achieve some of the versatility of the single-leg design but obtain the considerable benefits of the multi-leg design.

SUMMARY OF THE INVENTION

The foregoing and related objects are achieved in a windmill installation that includes a windmill and a windmill support tower with a platform on which the windmill is mounted. A multiplicity of legs connected to the platform extend downward from it. Each leg is connected to an associated base, and the connections between at least some of the legs and their associated bases are made by a compliance member that is compliant enough that the natural frequency of translational bending of the windmill installation—i.e., bending to accommodate substantially horizontal motion of the windmill—is less than the frequency at which blades pass the tower when the generator driven by the windmill is in synchronism with the power grid to which it is connected.

In accordance with another aspect of the invention, a further windmill compliance member provides the connection between the windmill and the top of the tower, and the compliance of this member is large enough that the natural pivotal bending frequency—i.e., the natural frequency of the mode of vibration in which the windmill tends to pivot with respect to the tower—is also less than the turbine synchronous frequency multiplied by the number of blades.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
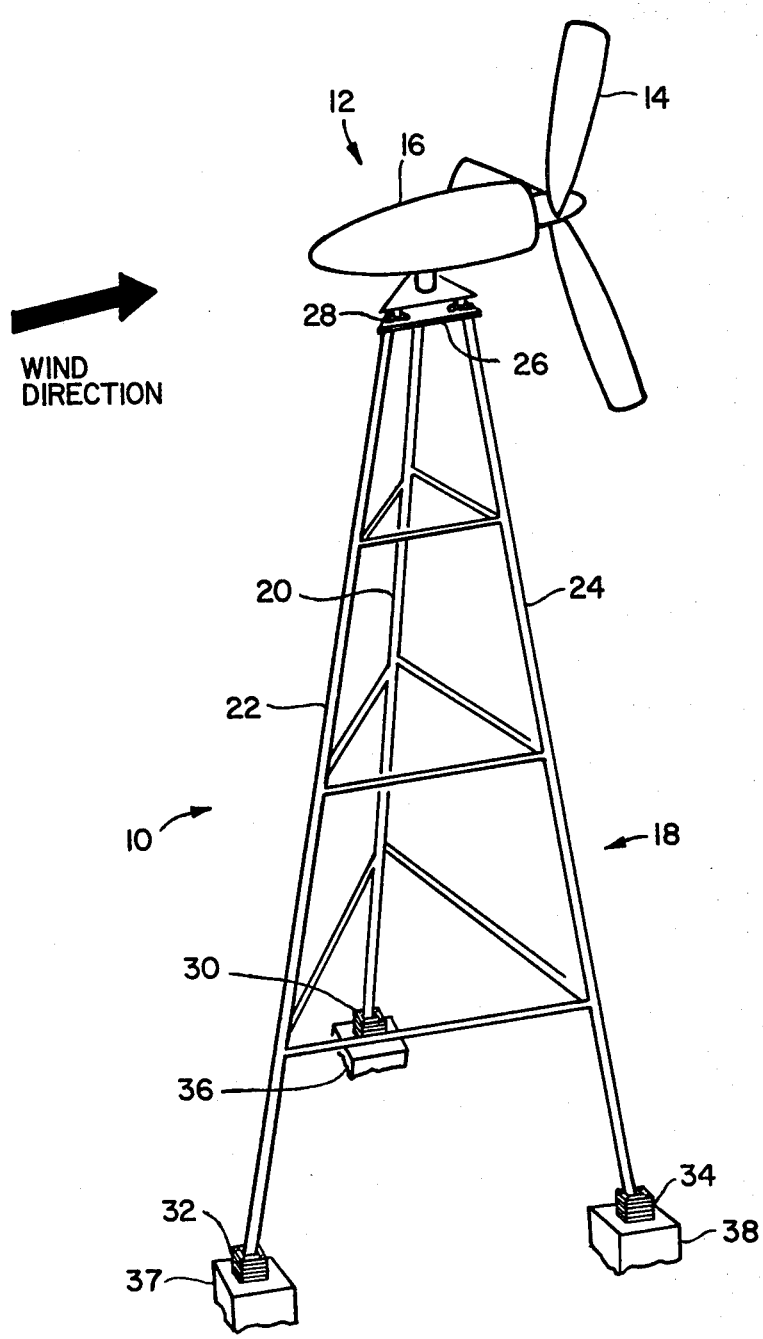
FIG. 1 a perspective view of one embodiment of the present invention.

FIG. 1 is a perspective view of a windmill installation 10 including a windmill 12, whose turbine blades 14 and housing 16 can be seen in the drawings. Not shown in the drawings is a turbine shaft inside the housing 16. The turbine shaft is driven by the turbine blades 14 and in turn drives a generator connected to a utility power grid. The pitch of the blades 14 is so controlled that, if there is enough wind, the turbine always spins at or slightly above the speed at which the generator is in synchronization with the power grid. As a result, during periods of greatest wind force, the tower experiences vibration at frequencies within a narrow range.

The windmill 12 is supported by a tower 18 that includes three legs 20, 22, and 24. The legs extend downward from a platform 26 to which they are connected, and the platform supports the windmill 12 by means of a windmill compliance assembly 28. Leg compliance members 30, 32, and 34 positioned at the bottoms of legs 20, 22, and 24, respectively, connect those legs to bases 36, 37, and 38, respectively, that anchor the tower to the ground.

In operation, the force of the wind flowing past the blades 14 of the windmill turbine causes them to rotate. If the wind speed is above a certain minimum value, a control system contained inside the housing 16 controls the pitch of the blades 14 so as to maintain a rotational frequency at which the generator produces a predetermined power. This rotational frequency depends on the design of the system and may be on the order of 1.2 Hz, which would mean that a blade enters the "shadow" of the tower 18 at a frequency on the order of $3 \times 1.2$ Hz$=3.6$ Hz. As a consequence, the rotating turbine sets up vibrations having components at 3.6 Hz and its harmonics. There may also be vibrations at 1.2 Hz and its harmonics due to asymmetries. If any of these frequencies is near the natural frequency of a mode of vibration of the windmill installation 10, excessive power can be coupled into the structure, straining it beyond design limits.

According to the present invention, however, the compliance members 28, 30, 32, and 34 add enough compliance to the structure that the natural frequency of any important mode of vibration is below the blade synchronous frequency of 3.6 Hz. Also, it should not be near the turbine synchronous frequency of 1.2 Hz. This arrangement affords the benefits of the multi-leg structure, such as relatively low interference with wind flow, low weight for a given strength, and relatively simple anchoring to the ground. Yet, because the natural frequencies of the tower are readily set by a proper choice of the compliance members—without requiring changes to other features of the structure—the design of the structure is versatile; a tower design that is suitable for a given windmill can in general be expected to be used for other windmills of the same or smaller size without a change in any design feature other than the compliance members.

Figure 2:
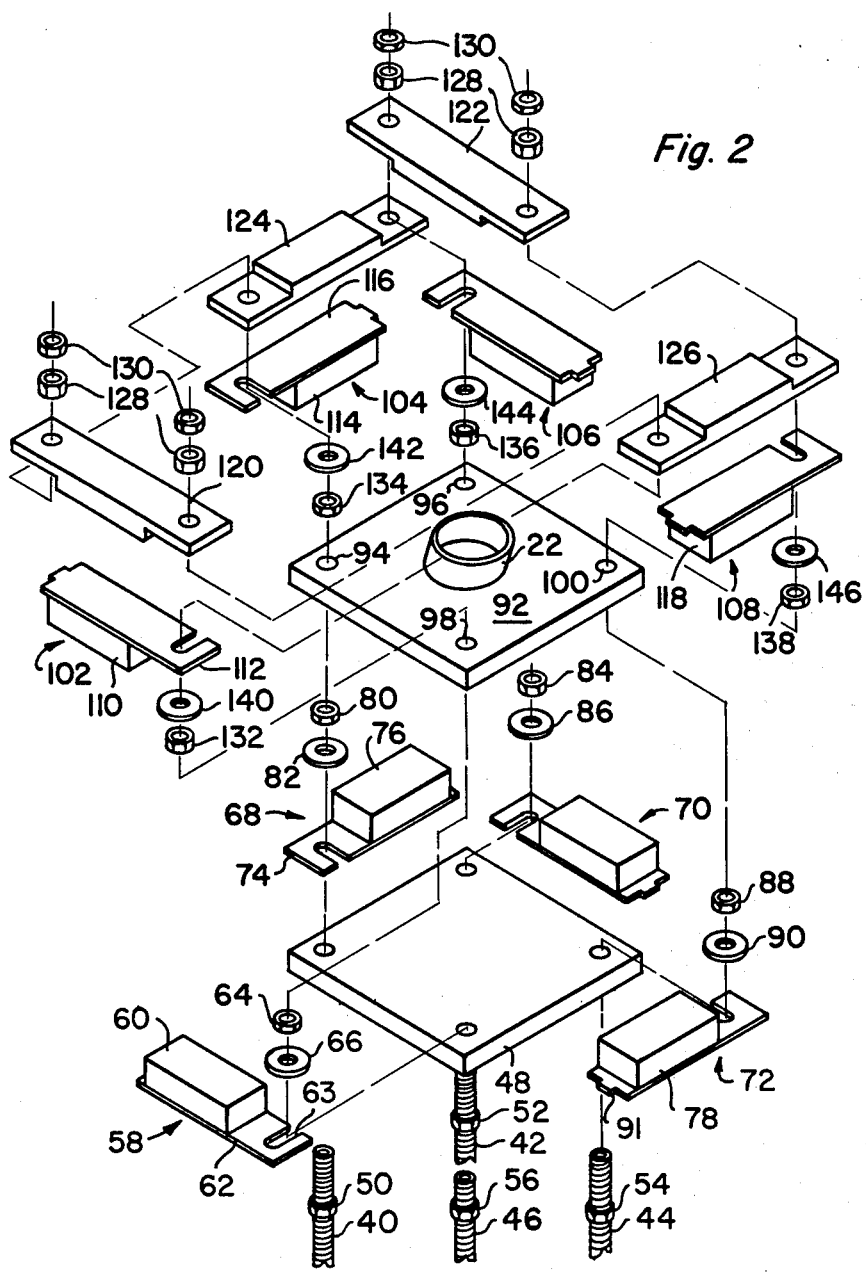
FIG. 2 is an exploded view of a leg compliance member connecting one of the tower legs to its base.
Figure 3:
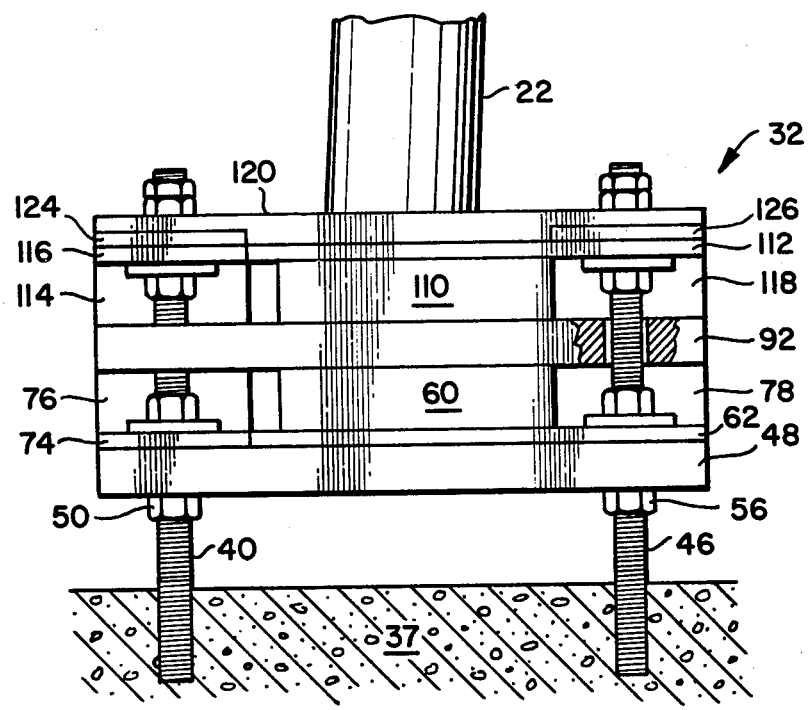
FIG. 3 is a side elevation of the assembled leg compliance member.

FIGS. 2 and 3 depict a leg compliance member 32 in greater detail. Four support studs 40, 42, 44, and 46 are anchored in the foundation 37 and extend through holes in the corners of a lower anchor plate 48. The studs are threaded and are fitted with respective nuts 50, 52, 54, and 56, which are used to adjust the height of plate 48.

A cushion member 58 is disposed on the lower anchor plate 48 and includes a pad 60 of rubber or other resilient material secured to a mounting plate 62 that has an elongated opening 63 through which stud 46 extends. The mounting plate 62, and thus the cushion member 58, is secured to the lower anchor plate 48 by means of a nut 64 and a washer 66.

Three other cushion members 68, 70, and 72 are disposed about the periphery of the anchor plate 48, as FIG. 2 indicates. Cushion member 68 is evidenced in FIG. 3 by its mounting plate 74 and resilient pad 76, while only the resilient pad 78 of cushion member 72 is visible in that drawing. Cushion members 68, 70, and 72 are secured to the lower anchor plate 48 by nuts and washers 80 and 82, 84 and 86, and 88 and 90, respectively. A tab 91 is provided on cushion member 72 to fit into the opening 63 in cushion member 58 so that adjacent cushion members 58 and 72 interlock. The other cushion members have similar tabs.

At the bottom end of tower leg 22 is welded a base plate 92, which rests on cushion members 62, 68, 70, and 72. It has holes 94, 96, 98, and 100 in its corners that are sized to provide clearance between the studs and the peripheries of these holes. Thus, the base plate 92 is free to move longitudinally of the studs to the extent permitted by the cushion members.

Further cushion members 102, 104, 106, and 108 are disposed above the base plate 92. These cushion members are mirror images of cushion members 58, 68, 70, and 72 because they are oriented opposite those cushion members so that their resilient pads face down rather than up. The resilient pad 110 and mounting plate 112 of cushion member 102 are visible in FIG. 3, as are the resilient pad 114 and mounting plate 116 of cushion member 104. Cushion member 108 is evidenced in FIG. 3 only by its resilient pad 118.

The upper cushion members 102, 104, 106, and 108 are secured to a composite upper anchor plate that consists of four upper-plate elements 120, 122, 124, and 126. These fit on the studs 40, 42, 44, and 46 and are secured in place by nuts 128 and lock nuts 130. As is apparent in FIG. 2, upper-plate elements 120 and 122 are disposed in opposition to upper-plate elements 124 and 126 to interlock with them to form a composite upper-plate element having a central aperture through which leg 22 extends. To this composite upper plate are secured the upper cushion members 102, 104, 106, and 108 by means of nuts 132, 134, 136, and 138, respectively, and washers 140, 142, 144, and 146, respectively.

The result of this arrangement is that the lower anchor plate 48 and the upper plate consisting of elements 120, 122, 124, and 126 are limited in their longitudinal motion along the studs 40, 42, 44, and 46. The base plate 92 on tower leg 22 is positioned between these anchor plates but is not secured to the studs. Instead, the resilient pads on the cushion members bear against the base plate 92 to hold it in position but add compliance that would not otherwise be present if the base plate 92 were merely anchored to the studs. The natural frequency of axial bending of the tower is thereby reduced.

Of course, the compliant substance need not be rubber; disks of other natural or synthetic materials can be substituted. In fact, other types of members that are sufficiently compliant, such as springs, can be used in place of the assemblies of FIGS. 2 and 3.

Figure 4:
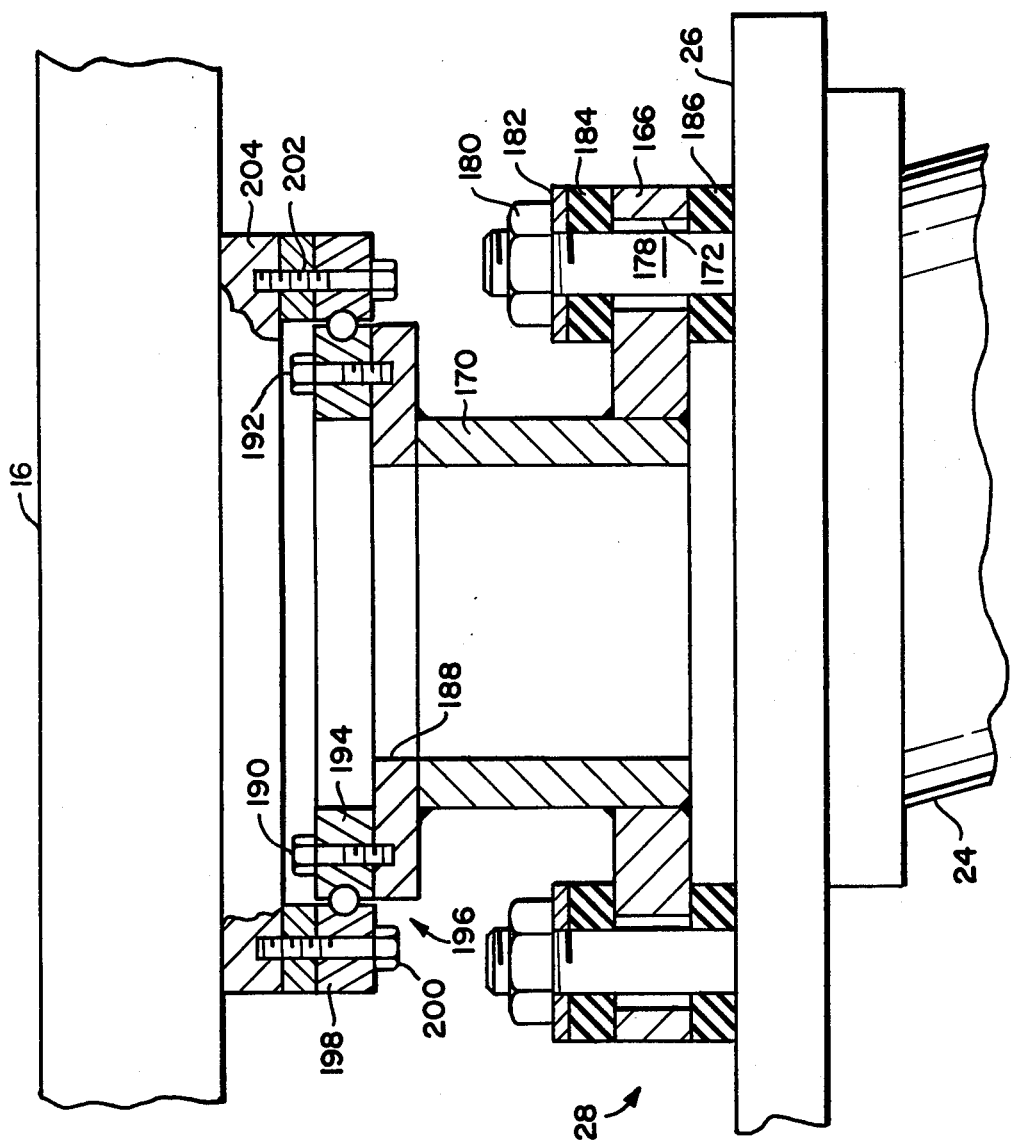
FIG. 4 is a side elevation with parts broken away showing the windmill compliance member and related parts in detail.
Figure 5:
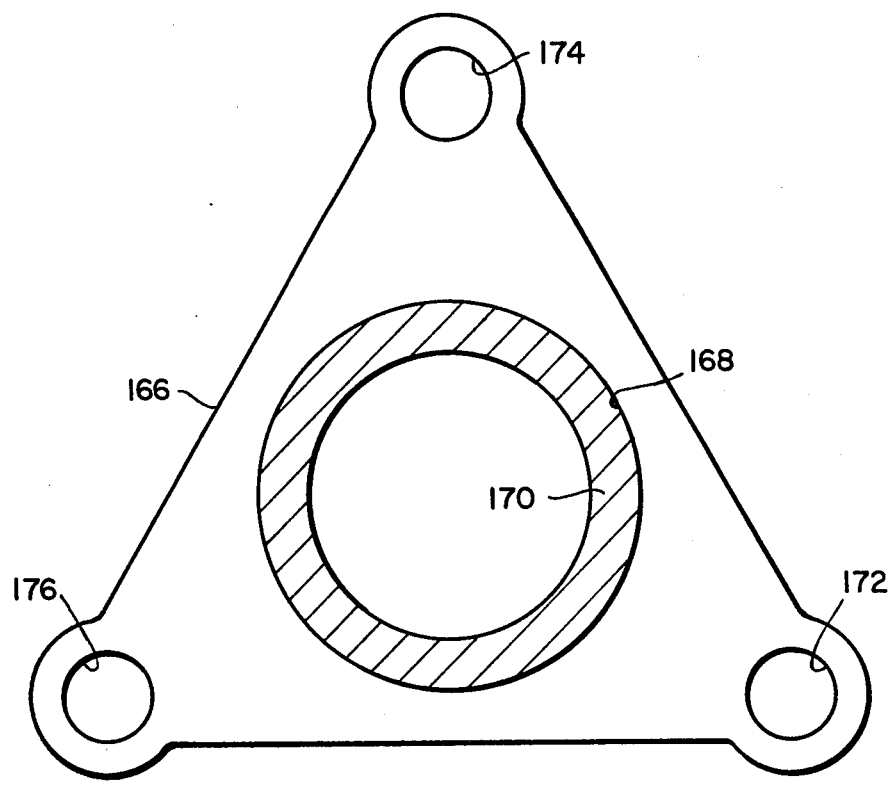
FIG. 5 is a plan view of a plate member that is part of the windmill compliance member.

FIGS. 4 and 5 show in more detail the windmill compliance assembly 28 by which the windmill is attached to the platform 26 of the windmill tower 18. The compliance assembly 28 includes a three-cornered member 166 (FIG. 5) that has a central opening 168 to whose edge a mounting tube 170 (FIG. 4) is welded. At the three corners of member 166 are corner openings 172, 174, and 176 that receive threaded studs such as stud 178, which is welded to the tower platform 26. A nut 180 threadedly engages the threaded stud 178 to bear against an end washer 182 that in turn squeezes a rubber disk 184 between it and the three-cornered member 166. A similar rubber disk 186 is disposed between member 166 and the tower platform 26. Assemblies similar to the assembly made up of elements 178 through 186 are associated with both of the other corner openings 174 and 176. In concert, those assemblies add compliance to the connection between the windmill and the tower and thus lower the natural frequency of the "nodding" vibration, i.e., the vibration in which the windmill tends to pivot with respect to the upper end of the tower.

The mounting tube 170 that is welded to the three-cornered member 166 extends upward to a bearing mounting plate 188 that is connected to the inner race 194 of a yaw bearing 196 by bolts 190 and 192. The outer race 198 of the bearing 196 is connected by further bolts such as bolts 200 and 202 to an upper bearing mounting plate 204, which is welded to the outer surface of the housing 16. The windmill 16 rotates on the yaw bearing 96 to follow the wind direction.

Figure 6:
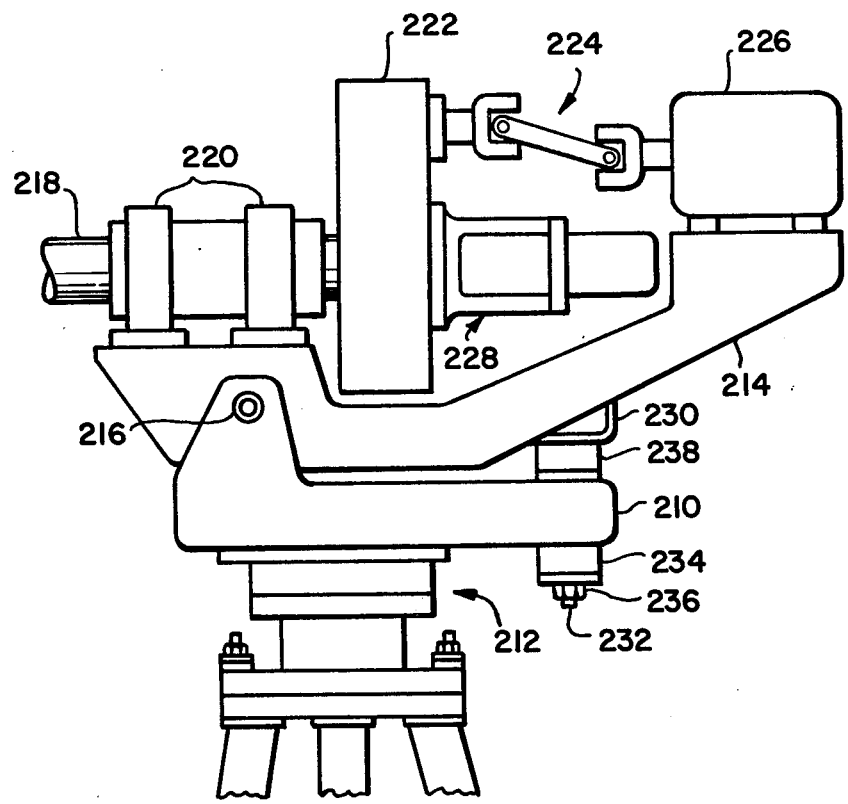
FIG. 6 is a side elevation of an alternate version of the windmill compliance member and related parts.

FIG. 6 depicts an alternate version of the windmill compliance member. In this version, a base member 210 is mounted on a yaw bearing 212 similar to that in FIG. 4. A pivot member 214 is mounted on base 210 by means of a pivot pin 216 and thereby supports the windmill The windmill is evidenced in FIG. 6 by a windmill shaft 218 mounted by bearings 220 to the pivot member 214. The shaft 218 drives a transmission 222 that in turn rotates a universal coupling 224 to drive a generator 226 and thereby generate electricity. Also seen in FIG. 6 is a pitch-control mechanism 228, which is used to control the pitch of the windmill blades.

The assembly consisting of the pivot member 214 and the windmill assembly including the blades (not shown), shaft 218, transmission 222, and generator 226 have a center of gravity approximately at the position of the pivot pin 216 so that gravity does not significantly favor pivoting in either direction about the axis of pin 216.

A bracket 230 is secured to the lower surface of the pivot member 214 and has a threaded stud 232 welded to it and extending downward through a resilient puck 234 that is supported by a nut 236 that threadedly engages the stud 232. Resilient puck 234 bears against the base 210, as does a second resilient puck 238, which is squeezed between base 210 and bracket 230.

A review of FIG. 6 reveals that counterclockwise pivoting of the pivot member 214 requires upward movement of the stud 232 and thus nut 236 to compress resilient puck 234 between the nut 236 and the base 210. Since the puck 234 is resilient, such "nodding" is permitted to a limited extent with respect to the tower. Clockwise pivoting of pivot member 214 similarly compresses puck 238. Thus, the pucks 234 and 238 of FIG. 6, like the disks 184 and 186 of FIG. 4, add compliance to the system and thus reduce the natural frequency of nodding vibration. The arrangement of FIG. 6 may be preferred in some applications because the shear stresses on its resilient members are considerably lower than those on the resilient members illustrated in FIG. 4.

Through the use of compliance members like those illustrated in the drawings, design of windmill installations is greatly simplified because various other design parameters can be optimized without any significant consideration given to achieving a natural frequency that differs from the expected vibrational frequencies. Once the rest of the design has been settled, the natural frequency of the resulting structure can be determined, and the compliance members can be included as necessary to insure that the natural frequencies of all significant vibrational modes are below at least the synchronous turbine frequency. Furthermore, changes in a design to suit a different windmill are necessary less often and can frequently be effected by merely changing the compliance members.

Thus, by following the teachings of the present invention, those skilled in the art can achieve the benefits of the multi-leg structure while avoiding the design constraints that had heretofore attended its use.

What is claimed is:

1. A windmill installation comprising:
    A. a windmill including a rotatably mounted turbine and a generator operationally connected to the turbine for driving thereby and for generation of electric power upon connection to a power grid when the rotational frequency of said turbine is equal to or greater than a predetermined turbine synchronous frequency, said turbine including a plurality of turbine blades, a given rotational position thereby being passed by a turbine blade at least at a blade synchronous frequency, equal to the turbine synchronous frequency multiplied by the number of turbine blades, when said generator is generating power;
    B. a windmill support tower supporting said windmill and including a platform on which said windmill is mounted, a multiplicity of legs connected to said platform and extending downward therefrom, a base associated with each of said legs and connected thereto, and a leg compliance member associated with each of at least a plurality of said legs, each leg compliance member providing the connection of its associated leg to the base associated therewith, said compliance members having enough compliance that the natural frequency of translational bending of said windmill installation is less than the blade synchronous frequency.

2. A windmill installation as recited in claim 1 further including a windmill compliance member providing the connection between said windmill and said platform, said windmill compliance member being compliant enough that the natural frequency of pivotal bending of said windmill installation is less than the blade synchronous frequency.

3. A windmill installation as recited in claim 1 or 2 in which said windmill support tower includes one of said leg compliance members associated with each of said legs, each leg compliance member providing the connection of its associated leg to the base associated therewith.

4. A windmill installation comprising:
    A. a windmill including a rotatably mounted turbine and a generator operationally connected to the turbine for driving thereby and for generation of electrical power upon connection to a power grid when the rotational frequency of said turbine is greater than or equal to a predetermined turbine synchronous frequency, said turbine including a plurality of turbine blades, a given rotational position thereby being passed by a turbine blade at least at a blade synchronous frequency, equal to the turbine synchronous frequency multiplied by the number of turbine blades, when said generator is generating power;
    B. a windmill support tower supporting said windmill and including a platform on which said windmill is mounted, a multiplicity of legs connected to said platform and extending downward therefrom, a base associated with each of said legs and connected thereto, and a windmill compliance member providing the connection between said windmill and said platform, said compliance member being compliant enough that the natural frequency of pivotal bending of said windmill installation is less than the blade synchronous frequency.

* * * * *